(12) United States Patent
Kasai et al.

(10) Patent No.: US 6,844,739 B2
(45) Date of Patent: Jan. 18, 2005

(54) MAXIMUM POWER POINT TRACKING METHOD AND DEVICE

(75) Inventors: Yuji Kasai, c/o National Institute of Advanced Industrial Science and Technology (AIST), AIST Tsukuba Central 2, 1-1-1 Umezono, Tsukuba-shi, Ibaraki (JP); Fumihisa Kano, Oyama (JP)

(73) Assignees: National Institute of Advanced Industrial Science and Technology, Tokyo (JP); Yuji Kasai, Tsukuba (JP)

( * ) Notice: Subject to any disclaimer, the term of this patent is extended or adjusted under 35 U.S.C. 154(b) by 296 days.

(21) Appl. No.: 10/092,993

(22) Filed: Mar. 8, 2002

(65) Prior Publication Data

US 2002/0163323 A1 Nov. 7, 2002

(30) Foreign Application Priority Data

Mar. 9, 2001 (JP) ........................................ 2001-067464

(51) Int. Cl.⁷ .............................. G01R 27/02; G05F 1/40
(52) U.S. Cl. ........................ 324/611; 323/284; 323/285
(58) Field of Search ................................ 324/611, 610, 324/609; 363/21; 323/906, 285, 299, 284, 908; 320/101

(56) References Cited

U.S. PATENT DOCUMENTS

| | | | |
|---|---|---|---|
| 4,794,272 A | * | 12/1988 | Bavaro et al. ................. 307/66 |
| 5,327,071 A | * | 7/1994 | Frederick et al. ........... 323/299 |
| 5,493,204 A | * | 2/1996 | Caldwell ..................... 323/299 |
| 5,867,011 A | | 2/1999 | Jo et al. ...................... 323/222 |
| 5,932,994 A | | 8/1999 | Jo et al. ...................... 323/299 |
| 6,031,736 A | * | 2/2000 | Takehara et al. .............. 363/98 |
| 6,057,665 A | | 5/2000 | Herniter et al. ............. 320/101 |
| 6,433,522 B1 | * | 8/2002 | Siri ............................ 323/272 |

FOREIGN PATENT DOCUMENTS

| | | |
|---|---|---|
| DE | 199 04 561 | 8/2000 |
| JP | 7-31157 | 1/1995 |
| JP | 8-182335 | 7/1996 |
| JP | 2000-333371 | 11/2000 |
| JP | 2001-60121 | 3/2001 |

* cited by examiner

*Primary Examiner*—Jay Patidar
*Assistant Examiner*—John Teresinski
(74) *Attorney, Agent, or Firm*—Oblon, Spivak, McClelland, Maier & Neustadt, P.C.

(57) ABSTRACT

The output current value of a direct-current power source obtained by low-frequency, minute modulation of the input voltage of a switching converter is detected in a circuit having an amplification factor switching function that switches the amplification factor between definite magnitudes synchronizing with the modulation, and by using a signal obtained by demodulating in a discriminator circuit the output of this circuit synchronizing with the modulation to control the switching converter, the power point of the switching converter can be tracked to the maximum power point by following the change in state of the direct current power source.

8 Claims, 9 Drawing Sheets

TO NEXT STANDARD POWER POINT →

← TO NEXT STANDARD POWER POINT

MAXIMUM POWER POINT TRACKING METHOD AND DEVICE

BACKGROUND OF THE INVENTION

1. Field of the Invention

This invention relates to a method and a device for implementing the method that tracks the optimal maximum power point in a system that supplies power from a direct-current power source, such as that generated by a solar cell array (photovoltaic generator), etc., which has a bow-shaped current-voltage characteristic, to a load via a switching converter so that the output power of the direct-current power source is maximized with respect to changes, etc., in the direct-current power source characteristic by controlling the operating point of the switching converter. The solar cell array (photovoltaic generator) shown above is hereinafter referred to simply as a solar cell.

2. Description of the Prior Art

A prior art method that controls the power point (operation point) so that the power generated by the solar cell is maximized measures the voltage and current of the solar cell, performs an analog-digital conversion of those values and then digitally calculates the product of the voltage and current, or calculates the product of the voltage and current by analog computation, and then varies the duty ratio of the switching converter connected to the solar cell so that this product is maximized.

There is also known a method that monitors the output of the switching converter and varies the duty ratio of the switching converter so that the voltage or current of the output is maximized. Another method that is generally used measures the temperature of the solar panel and controls the power point using that temperature as a function of the temperature.

However, the control circuits in the above methods that measure the voltage and current of the solar cell and calculate their product are complicated and expensive. There is also a problem with quantization error in the analog-digital conversion. Further, the method that monitors the output of the switching converter is severely affected by fluctuation in the load. In the method that controls by measuring the temperature, etc., control shifts far from the optimal power point due to the inconsistency of the temperature of the solar panel or the intensity of sunlight or wind to which it is subjected, and it is necessary to attach a sensor and wire it for measuring the temperature, etc.

The purpose of this invention is to provide an inexpensive tracking method and device that do not require a temperature measurement sensor, are not affected by inconsistencies in the state of the solar panel or fluctuations in the load, and are capable of accurately tracking the power point so that the power generated by the solar cell is maximized.

SUMMARY OF THE INVENTION

The maximum power point tracking method of this invention is a method that supplies the power of a direct-current power source, which has a bow-shaped current-voltage characteristic, to a load via a switching converter, wherein:

the output current value of the direct-current power source, which undergoes low-frequency, minute modulation of the input voltage to the switching converter, is detected in a circuit with an amplification factor switching function that switches the amplification factor between definite magnitudes synchronizing with the modulation, and the switching converter is controlled using a signal obtained in a discriminator circuit by demodulating the output of this circuit synchronizing with the modulation.

The maximum power point tracking device of this invention is a device that supplies the power of a direct-current power source, which has a bow-shaped current-voltage characteristic, to a load via a switching converter and comprises:

(1) a circuit for performing low-frequency, minute modulation that alternately switches the input voltage of the switching converter between two voltage values, (2) a circuit that detects the output current value of the direct-current power source and has an amplification factor switching function that switches the amplification factor between definite magnitudes synchronizing with the modulation in (1) above, (3) a discriminator circuit for obtaining the component synchronized with the modulation in (1) of the output of the circuit in (2), and (4) a circuit that uses the output of the circuit in (3) to generate a signal that is also input to the switching converter control circuit.

This invention also has a means that sets the operation range so that the switching converter will definitely operate at the maximum power point.

Further, the direct-current power source, which has a bow-shaped current-voltage characteristic, of this invention is at least one of a solar cell, a direct-current power source that generates power using wind power, and a direct-current power source that generates power using wave power.

The circuit that performs tracking of the power point in the maximum power point tracking comprises mainly a simple pulse generator, an amplifier, and semiconductor switches and can be realized inexpensively using a small number of general-use parts.

Further, by using the method of this invention, it is possible to obtain the maximum output power generation in a direct-current power source at a lower cost, energy utilization efficiency is improved, and the recovery period for equipment investment cost can be shortened.

Other purposes and features of this invention will be clarified in detailed explanations below based on the attached drawings.

DESCRIPTION OF THE PREFERRED EMBODIMENT

Figure 2:
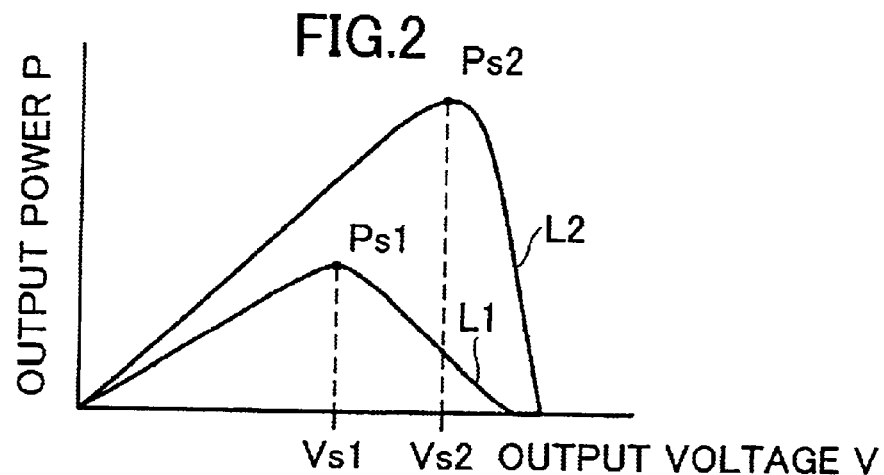
FIG. 2 is a graph depicting a typical output power vs. output voltage characteristic of a solar cell.
Figure 3:
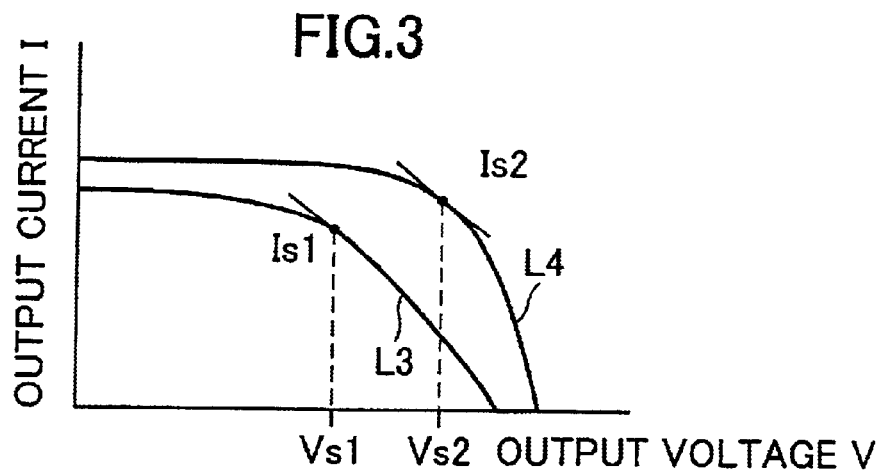
FIG. 3 is a graph depicting a typical output current vs. output voltage characteristic of the solar cell.

First, the characteristics of the direct-current power source, having a bow-shaped current-voltage characteristic and upon which this invention is premised, are explained. FIG. 2 shows the output power vs. output voltage characteristic (P–V) of a solar cell, and FIG. 3 shows the output current vs. output voltage characteristic (I–V) of the solar cell. In the current-voltage characteristic of a direct-current power source such as a solar cell, the current tends to decrease as the voltage increases, i.e., it has a bow-shaped characteristic that tends to drop off (this is referred to simply as a bow-shaped characteristic in this specification below). The output characteristic of a solar cell will vary with changes in the ambient temperature of the solar cell or the intensity of sunlight accompanying seasonal changes, etc. As the ambient temperature of the solar cell decreases, the characteristic curves will change from L1 to L2 and from L3 to L4, and as the intensity of sunlight decreases, the characteristics curve will change from L2 to L1 and from L4 to L3, for example. Since the characteristic curves are ever changing depending on the season, weather and time of day, it is necessary to control the optimal operating voltage in conjunction with this change.

The output current vs. output voltage characteristic in FIG. 3 is bow-shaped with turning points ($VS_1$, $IS_1$) and ($VS_2$, $IS_2$), and the output power at these voltages is maximum ($PS_1$, $PS_2$). Also, the slopes of the I–V characteristic curves L3 and L4 at these turning points are $-IS_1/VS_1$ and $-IS_2/VS_2$, respectively. In other words, when the relational expression P=VI is differentiated with V, $\Delta P/\Delta V = I + V \cdot \Delta I/\Delta V$, and when the output power P is maximum, $\Delta P/\Delta V = 0$. Therefore, $\Delta I/\Delta V = -I/V$ at this time.

This shows that when the output power P is maximum, the tangent line to the I–V characteristic curve has a slope $-I/V$. The inventors noticed that this characteristic did not change even if the characteristic curve changed as in FIG. 2 and FIG. 3. This invention utilizes this unchanging characteristic in controlling the switching converter so that the slope of the line tangent to the I–V characteristic curve becomes $-I/V$, thus causing that power point to follow the power point of the maximum output power of the direct-current power source even if the characteristic of the direct-current power source should be caused to vary due to condition changes.

Figure 4:
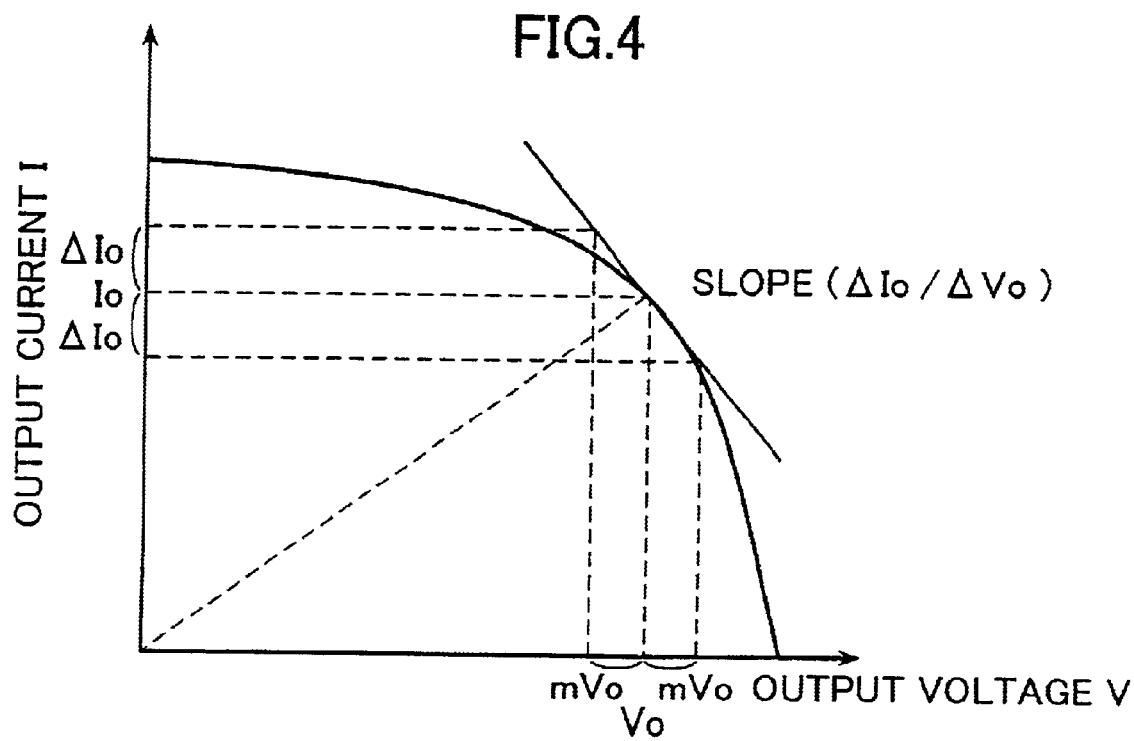
FIG. 4 is an explanatory drawing showing the output current vs. output voltage characteristic of the solar cell.

The operating principle of the maximum power point tracking of this invention is explained using FIG. 4, which shows the same characteristic of the solar cell as in FIG. 3.

To vary the output voltage V of the solar cell up or down at a selected power point (Vo, Io), the impedance R of the load of the solar cell can be changed. If the impedance R is increased, the power point Vo changes in the increasing direction, and if the impedance R is decreased, it changes in the decreasing direction.

In this invention, the output voltage Vo of the solar cell is minutely changed by $\Delta$Vo by varying the impedance of the load on the solar cell, i.e., the input impedance of the switching converter. Since the change $\Delta$I in the output current Io of the solar cell at this time is only a minute change, by using the slope ($\Delta$Io/$\Delta$Vo) of the line tangent to the characteristic curve at the selected power point (Vo, Io), the following relations are obtained.

Here, the ratio of the minute change in the voltage is m=$\Delta$Vo/Vo (e.g., m=0.01), the ratio of the minute change in the output current Io is $$\Delta Io/Io = (\Delta Io/\Delta Vo) \times \Delta Vo/Io$$

Therefore, $$\Delta Io/Io = (\Delta Io/\Delta Vo) \times (Vo/Io) \times m \qquad \text{Equation (1)}$$

Incidentally, as noted above, the slope at the maximum point (Vs, Is) is $Is/\Delta Vs = -Is/Vs$, and from Equation (1), therefore $\Delta Is/Is = -m$ i.e., $|\Delta Is/Is| = m$.

When Vo>Vs, as is evident from the characteristic curve, $|(\Delta Io/\Delta Vo)| > |\Delta Is/\Delta Vs|$ and yet Vo/Io>Vs/Is i.e., $|(\Delta Io/\Delta Vo)| \times (Vo/Io) > 1$ Therefore, from Equation (1), $$|\Delta Io/Io| > m$$

When Vo<Vs, then similarly $|\Delta Io/Io| < m$

Since the impedance (R) and power point have the relationship described above, if the switching converter is automatically controlled and the change rate $\Delta Io/Io$ of the solar cell output current Io is greater than m, then the impedance R decreases, and if it is controlled and the change rate $\Delta Io/Io$ is smaller than m, then the impedance R increases, whereby the power point stabilizes at the maximum output power point.

Figure 1:
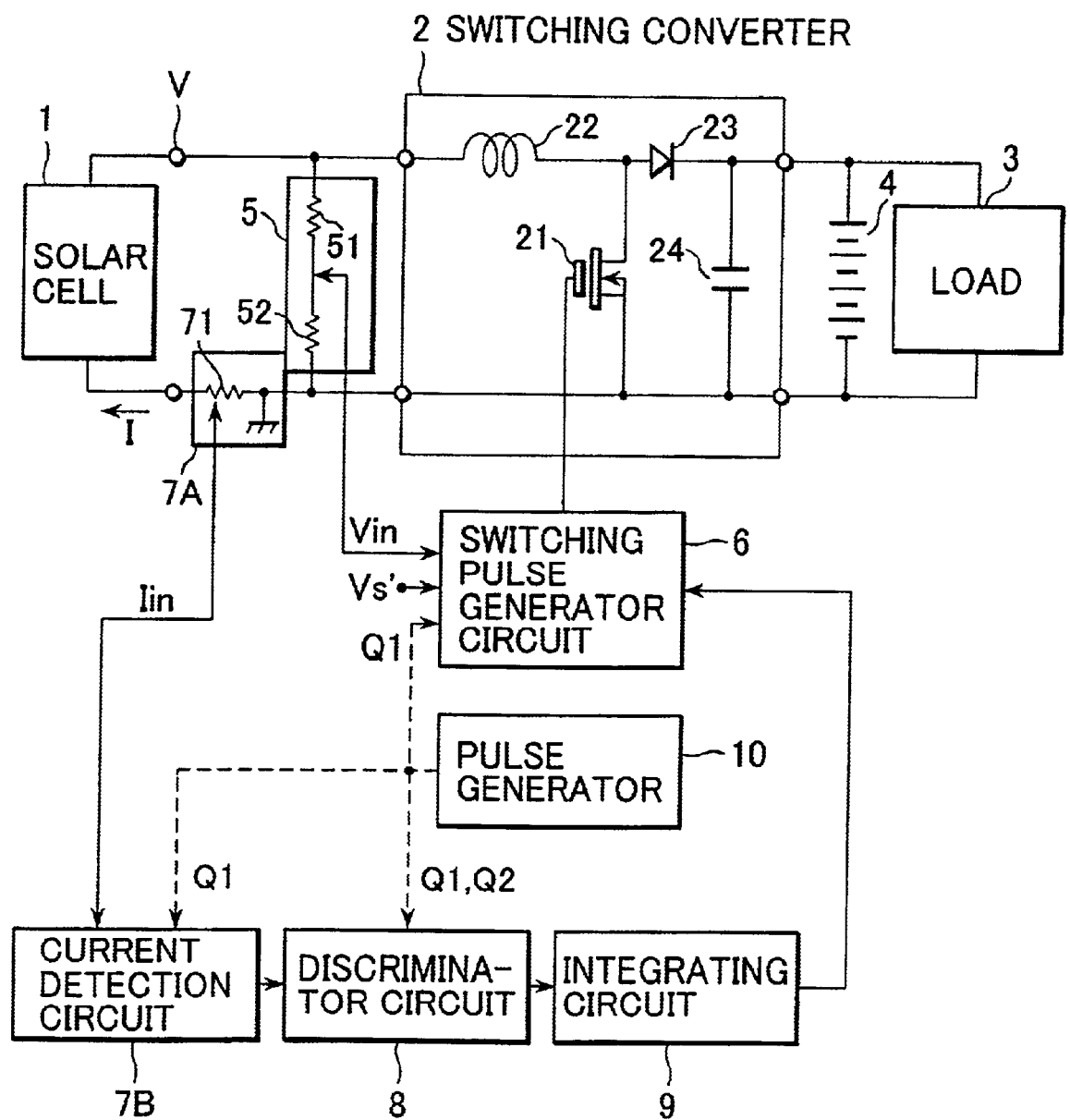
FIG. 1 is a schematic diagram of a circuit for implementing the maximum power point tracking method of this invention.

FIG. 1 shows an embodiment of the circuit schematic for implementing the invention, wherein a solar cell is used as the direct-current power source, which has a bow-shaped current-voltage characteristic, and the power of the solar cell 1 is supplied to the load 3 and backup battery 4 via the input voltage-controlled switching converter 2. In FIG. 1, 5 is a detection voltage input circuit that measures the input voltage to the switching converter 2, 6 is a switching pulse generator circuit that outputs a voltage control signal to the switching converter 2, 7A is a detection current input circuit, 7B is a current detection circuit, 8 is a discriminating circuit, 9 is an integrating circuit, and 10 is a pulse generator that provides timing for the modulation signal to the current detection circuit 7B, discriminator circuit 8 and switching pulse generator circuit 6. The pulse generator 10 outputs output pulses Q1 and Q2, which are reversed from each other.

Further, inside the switching converter 2, 21 is a switching element, 22 is a cell (inductance), 23 is a rectifier (diode), and 24 is a capacitor. In the detection voltage input circuit 5, 51 and 52 are the voltage division resistors for detecting the input voltage Vin, and 71 in the detection current input circuit 7A is the current sensing resistor for detecting the input current.

Figure 5:
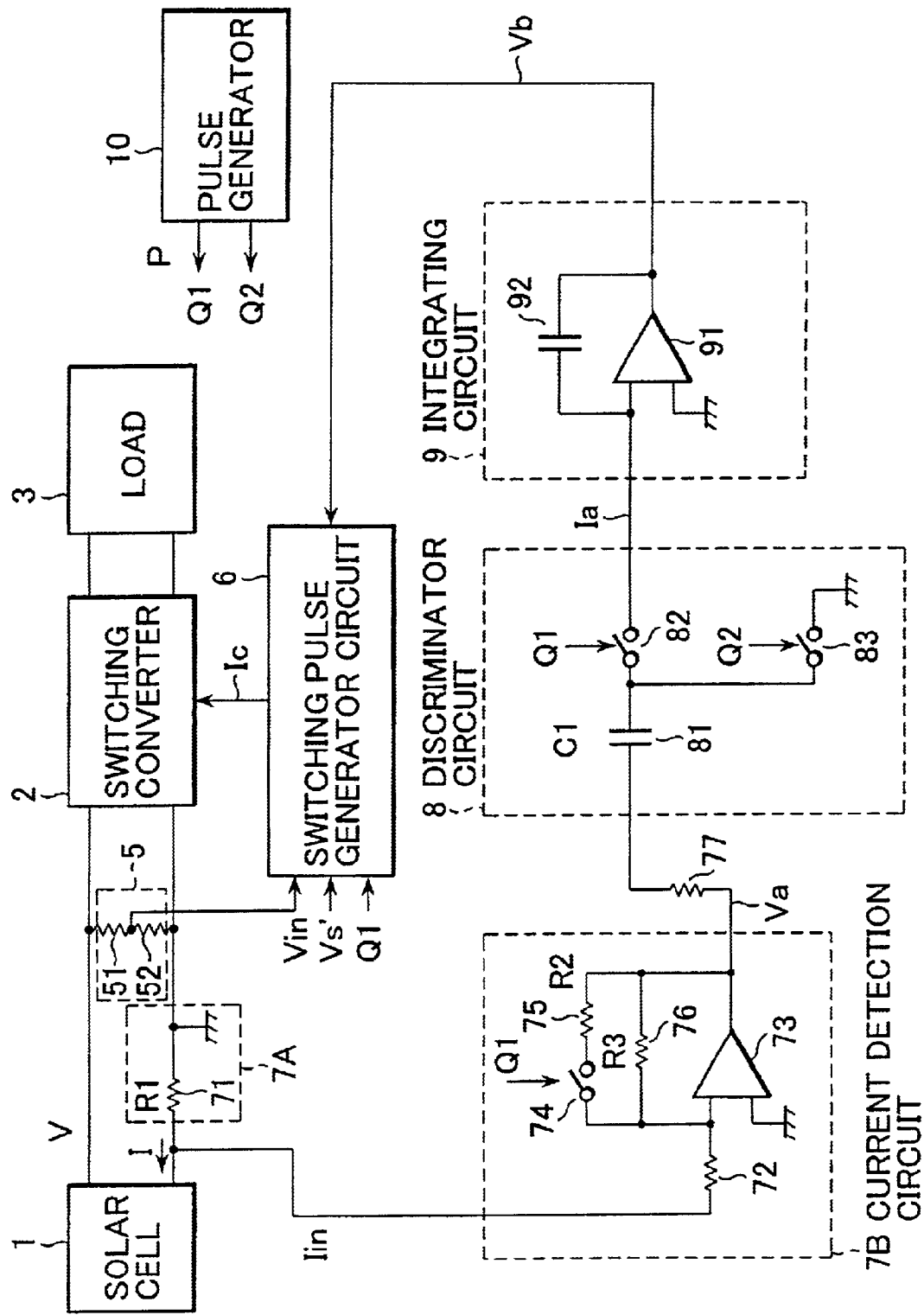
FIG. 5 is a schematic diagram showing the specific circuits of the current detection circuit, discriminator circuit and integrating circuit in FIG. 1.
Figure 6:
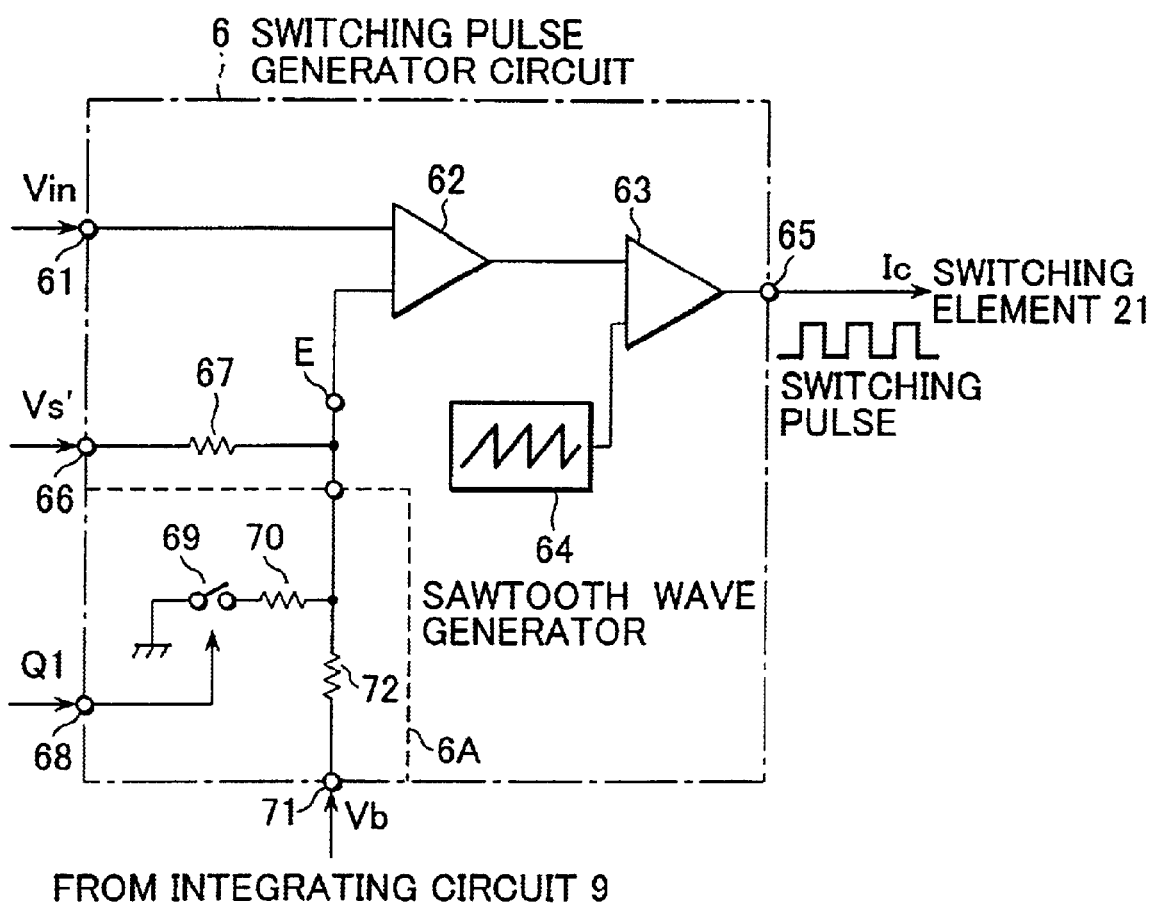
FIG. 6 is a schematic diagram showing the specific circuit of the switching pulse generator circuit in FIG. 1.

FIG. 5 shows a set of specific example of the current detection circuit 7B, the discriminator circuit 8 and the integrating circuit 9, and FIG. 6 shows a specific example of the switching pulse generator circuit 6.

In FIG. 5, 73 and 91 are operational amplifiers (differential amplifiers), 74 and 82 are semiconductor switching elements that are switched on and off by the pulse signal Q1 output by the pulse generator 10, 83 is a semiconductor switching element switched on and off by the pulse signal Q2 output by the pulse generator 10, 72, 75 and 76 are resistors, and 81 and 92 are capacitors. In FIG. 6, 62 is a differential amplifier, 63 is a comparator, 64 is a sawtooth wave generator, 69 is a semiconductor switching element switched by the pulse signal Q1, and 67, 70 and 72 are resistors. Also, 61, 66, 68 and 71 are input terminals on the switching pulse generator circuit 6, and 65 is an output terminal.

The switching converter 2 and switching pulse generator circuit 6 perform control using a value proportional to the reference voltage E as the target input voltage for the switching converter 2. By amplifying the difference between the voltage Vi proportional to the detection input voltage Vin and the reference voltage E in the differential amplifier 62 and comparing this differential output with the output of the sawtooth wave generator 64, the PWM output is output to the switching element 21 of the switching converter 2 and a smoothed voltage output is supplied to the load 3. Except for the circuit component 6A, the circuit is a constant-voltage control circuit for a conventional switching converter 2.

FIG. 7 and FIG. 8 are timing sequence charts for the modulation operation state of the control circuit of this invention. FIG. 7(a) and FIG. 8(a) show the pulses Q1 and Q2 output from the pulse generator 10 and reversed with respect to each other. T1 indicates the period pulse Q1 is off and pulse Q2 is on, and T2 indicates the period pulse Q1 is on and pulse Q2 is off. FIG. 7(b) shows the waveform of the detection input voltage Vin corresponding to the solar cell output (input of the switching converter 2), FIG. 7(c) shows the waveform of the detection current Iin corresponding to the solar cell output and FIG. 7(d) is a waveform representing the alternation in the amplification factor A of the current detection circuit 7B. FIG. 8(b) shows the output waveform of the current detection circuit 7B, and FIG. 8(c) shows the output waveform of the discriminator circuit 8. These waveforms are synchronized with the pulses Q1 and Q2 shown in FIG. 7(a) and FIG. 8(a).

The switching pulse generator circuit 6 outputs the switching pulse Ic, whose duty ratio is controlled by amplifying the difference between the detection input voltage and the reference voltage (equal to the standard voltage Vs' when the maximum power tracking control signal of this invention is not present) in the differential amplifier 62 and comparing it with the sawtooth wave output from the sawtooth wave generator 64 in the comparator 63, to the switching element 21 of the switching converter 2. The on/off state of the switching element 21 is controlled by the duty ratio of the switching pulse, whereby the switching converter 2 supplies a smoothed voltage to the load 3.

The low-frequency, minute modulation (alternation) operation of this invention is explained below. The semiconductor switching element 69 of the switching pulse generator circuit 6 is switched on and off repeatedly by the signal Q1 from the pulse generator 10, whereby the standard voltage Vs' and Vb are modulated to a waveform that conforms to the reference voltage E modulated according to the division ratio determined by resistor 67, resistor 72 and resistor 70 (alternation ratio 2 m), and the output voltage V from the solar cell is modulated to the waveform shown in FIG. 7(b). The switching converter 2 applies minute modulation (alternation ratio is 2 m) to the input voltage, i.e., the output voltage V of the solar cell, by means of the signals Q1 and Q2 from the pulse generator 10 at a frequency lower than the sawtooth wave frequency.

Figure 7A:
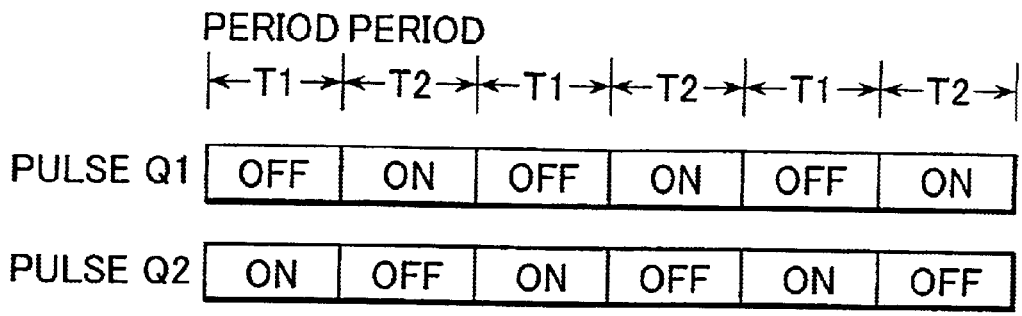
FIG. 7(a) is a time sequence chart for the pulses $Q_1$ and $Q_2$ output by the pulse generator.
Figure 7B:
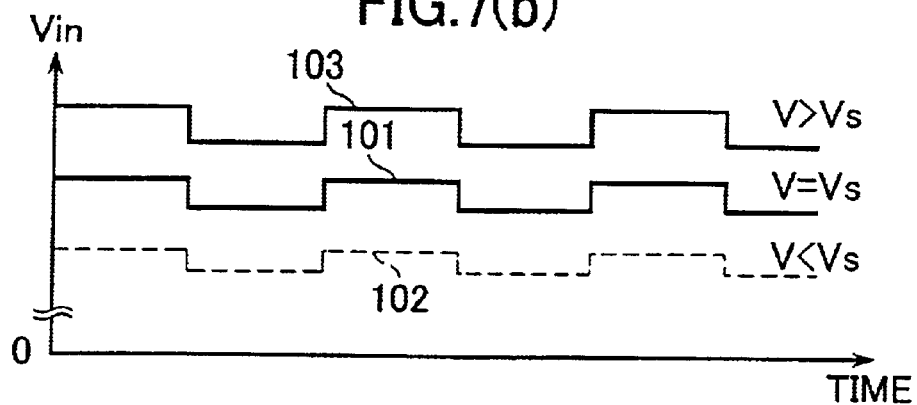
FIG. 7(b) shows the waveforms of the detection input voltages of solar cell output.

The output voltage V of the solar cell that has undergone low-frequency, minute modulation becomes a voltage corresponding to the detection input voltage Vin in FIG. 7(b). Curve 101 represents the waveform of the detection input voltage Vin when the output voltage of the solar cell is the optimal voltage (Vs) under optimal conditions in which the maximum power generation (Pm) is achieved, curve 102 represents the detection input voltage Vin when the output voltage is lower than the optimal voltage, and curve 103 represents the detection input voltage Vin when the output voltage is higher than the optimal voltage.

At this time, since the current-voltage characteristic of the solar cell is the curve shown in FIG. 3, the output current I of the solar cell simultaneously undergoes low-frequency, minute modulation whose phase is reversed 180 degrees from the minute modulation of the output voltage V. The current detection circuit 7B amplifies the voltage generated at the resistor 71 with the resistance value R1 proportional to the output current I in the operational amplifier 73, and this circuit switches (alternates) the amplification factor A of the operational amplifier 73 by switching the composite value of the feedback resistors 75 and 76 by switching the semiconductor switching element 74 by means of the signal Q1 from the pulse generator 10. The resistance value R2 of the resistor 75 is selected so that the alternation ratio in the amplification factor A is the same as the alternation ratio 2 m of the output voltage V and has the same phase as the output voltage V. For example, R2=R3×(1−m)/2m, where R3 is the resistance value of the resistor 76.

Figure 7C:
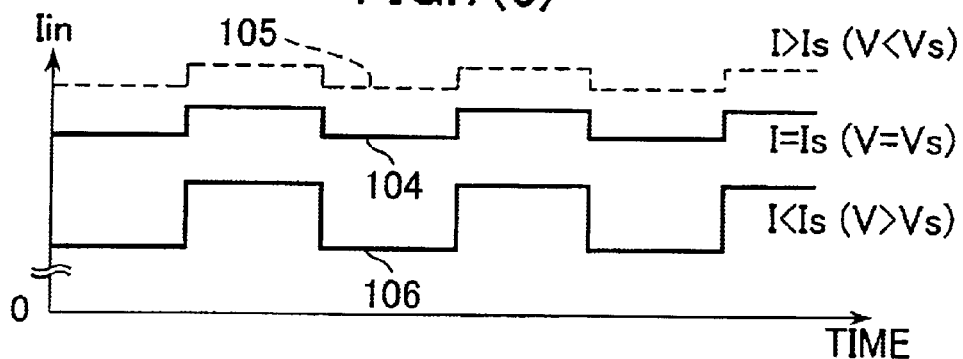
FIG. 7(c) shows the waveforms of the solar cell output current.
Figure 7D:
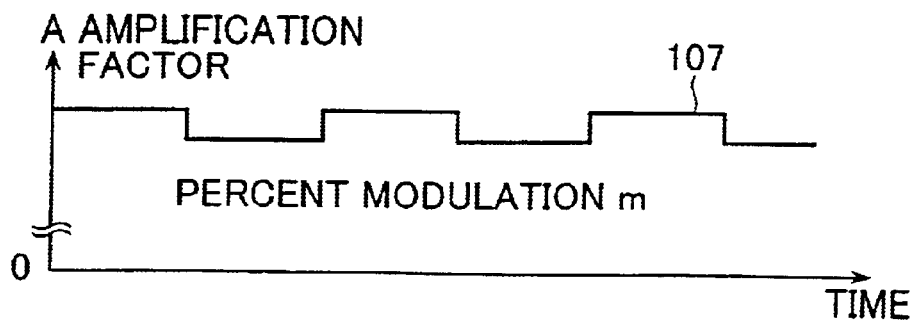
FIG. 7(d) shows the waveform of the amplification factor of the current detection circuit.

In FIG. 7(c), the waveform of the detection input current Iin is represented by 104 when the output voltage of the solar cell is the optimal voltage Vs, by 105 when lower than the optimal voltage Vs, and by 106 when higher than the optimal voltage Vs. The output current I of the solar cell is proportional to the waveform of the detection input current Iin.

The output value Va of the current detection circuit 7B is obtained by Va=Iin×A using the amplification factor A of the current detection circuit. The actual output voltage has opposite polarity because of the inversion operation of the operational amplifier, but positive values (absolute values) are used here for the sake of convenience. Here, the amplification factor A is switched alternately between two amplification factors in sync with the output pulse of the pulse generator 10, and therefore the value of Va becomes a different modulated value depending on the state of the solar cell.

That is, when the output voltage V of the solar cell is the optimal value Vs, the value of Va is the same when Q1 is on (period T2) and when Q1 is off (period T1), but when V is lower than the optimal value Vs, the value of Va when Q1 is on (period T2) is lower than when Q1 is off (period T1), and when V is higher than the optimal value Vs, the value of Va is higher when Q1 is on (period T2) than when Q1 is off (period T1).

Figure 8A:
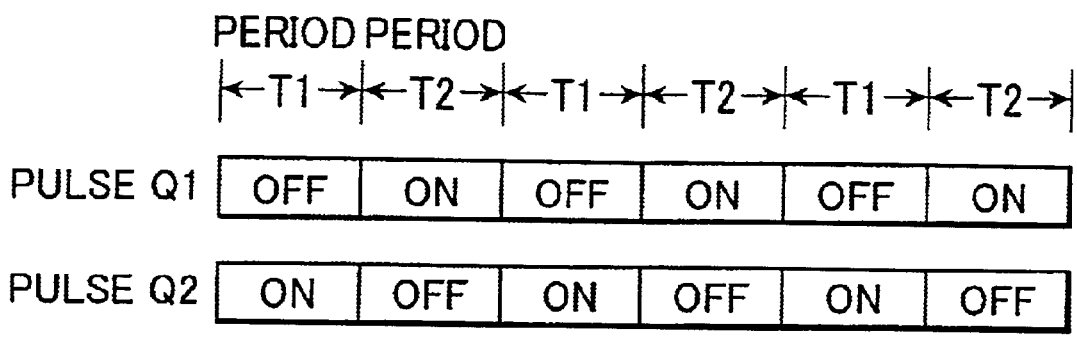
FIG. 8(a) is a time sequence chart for the pulses $Q_1$ and $Q_2$ output by the pulse generator.
Figure 8B:
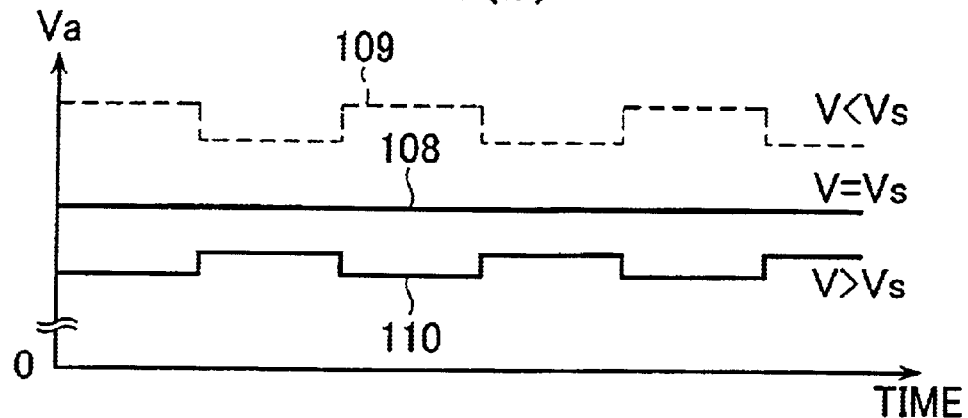
FIG. 8(b) shows the output waveforms of the current detection circuit.

The output 108 in FIG. 8(b) represents the waveform when the output voltage V of the solar cell is the optimal value Vs, output 109 represents the waveform when V is lower than the optimal value Vs, and output 110 represents waveform when V is higher than the optimal value Vs.

The discriminator circuit 8 obtains information on the output power point of the solar cell by synchronous detection of the outputs (Va) 108, 109 and 110 of the current detection circuit 7B by means of the output pulse of the pulse generator 10. The semiconductor switching elements 82 and 83 are switched on and off by the outputs Q1 and Q2 of the pulse generator 10. The voltage of the capacitor 81 is reset when the semiconductor switching element 83 is in an on state (period T1), and the current is output to the integrating circuit 9 when the semiconductor switching element 82 is in an on state (period T2).

Figure 8C:
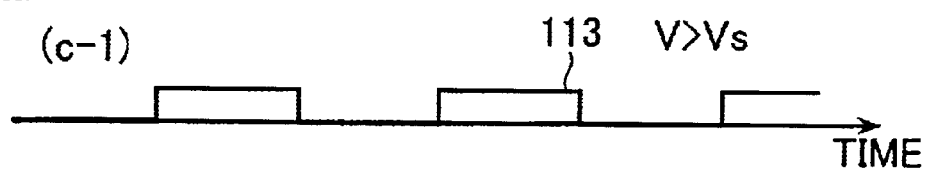
FIG. 8(c) shows the output waveforms of the discriminator circuit.
Figure 8C:
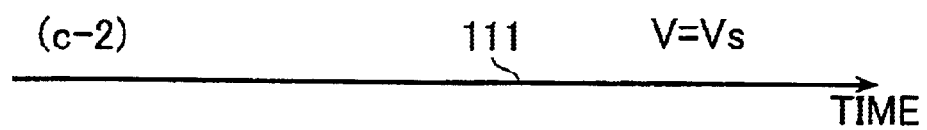
Figure 8C:
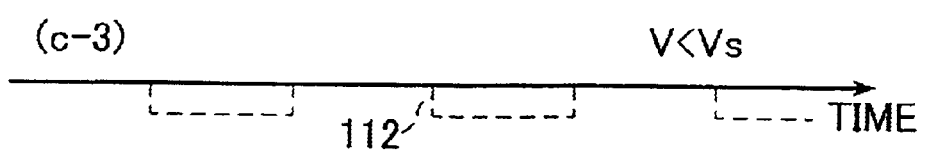

FIG. 8(c) shows the waveforms 111, 112 and 113 of the outputs of the discriminator circuit, where output 111 is the waveform when the output voltage V of the solar cell is the optimal value Vs, output 112 is the waveform when V is lower than the optimal value Vs, and output 113 is the waveform when V is higher than the optimal value Vs.

The integrating circuit 9 integrates the output signal Ia of the discriminator circuit 8, which is then added to the standard voltage Vs' of the switching pulse generator 6 to vary the reference voltage E. When the output voltage V of the solar cell is the optimal value Vs, the output voltage of the integrating circuit 9 is constant and the switching control signal Ic does not change, but when it is lower than the optimal value Vs, the output voltage of the integrating circuit 9 varies the switching control signal Ic in a direction that increases the input voltage of the switching converter 2, and when the output voltage V is higher than the optimal value Vs, the output voltage of the integrator 10 varies the switching control signal 1c in a direction that lowers the input voltage of the switching converter 2.

Figure 9A:
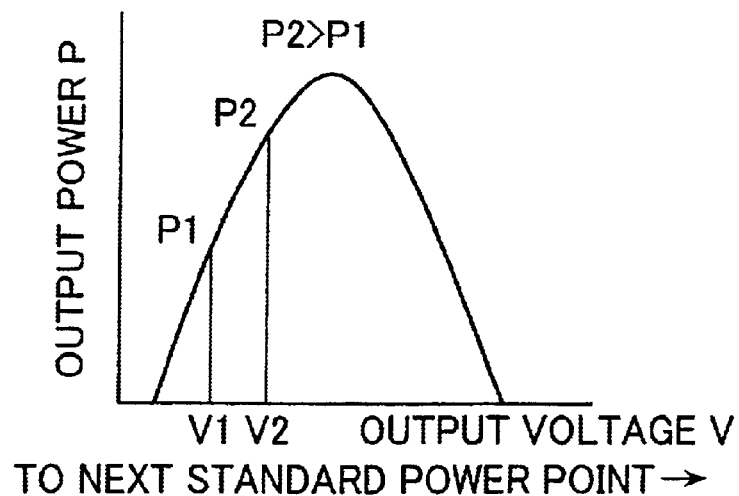
FIG. 9(a) shows the power point when the output voltage of the solar cell is smaller than the optimal output voltage.

FIG. 9 shows graphs depicting the transition in the power point of the solar cell output voltage in this invention. When the output voltage V is smaller than the optimal output voltage Vs (voltage that outputs maximum output power Pm) as in FIG. 9(a), low-frequency, minute modulation by the pulse Q1 of the standard voltage Vs' will vary between V1 and V2, for example, in which case the discriminator circuit 8 will output the output waveform of (c-3) in FIG. 8(c) and the switching converter 2 will be controlled by the switching control signal Ic output by the switching pulse generator circuit 6, thus causing the output operating voltage V to move toward the voltage Vs.

Figure 9B:
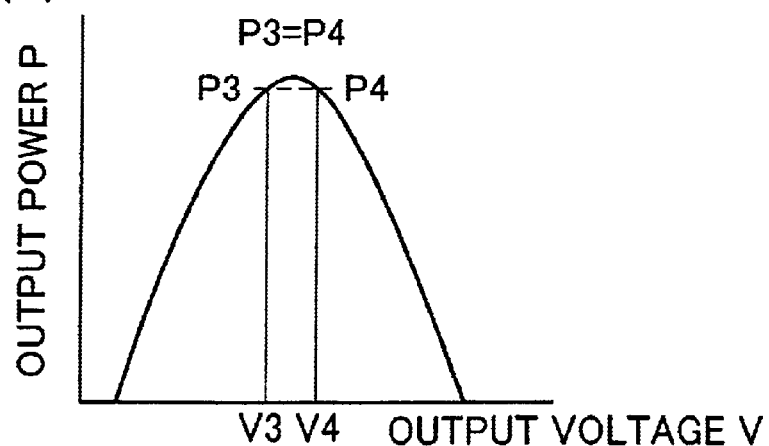
FIG. 9(b) shows the power point when the output voltage of the solar cell meets the optimal output voltage.
Figure 9C:
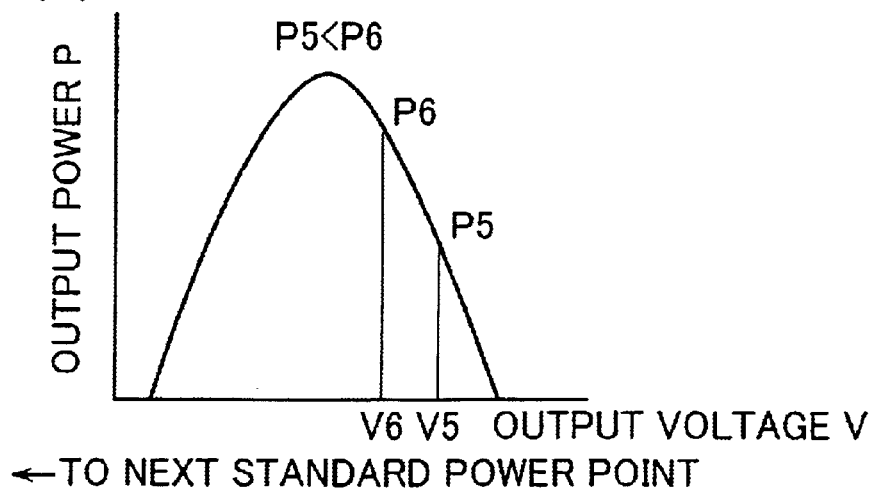
FIG. 9(c) shows the power point when the output voltage of the solar cell exceeds the optimal output voltage.

FIG. 9(c) shows control at output voltages V5 and V6, which exceed the optimal voltage value Vs. The output voltages V5 and V6 are controlled in a way that causes them to move toward the optimal voltage Vs. FIG. 9(b) shows control of the output voltage around the optimal output voltage Vs, in which case the output voltage varies with an alternation ratio of 2 m (=$\Delta$V/V, modulation ratio is m) and will vary between V3 and V4.

The above operation is explained below using numerical equations. The output voltage of the solar cell is modulated so that it becomes V (1+m) during period T1 and V (1−m) during period T2.

When the output voltage V of the solar cell is smaller than the optimal voltage Vs, the output current of the solar cell becomes I (1−ma) in period T1 and I (1+ma) in period T2. When the output voltage V of the solar cell is the optical voltage Vs, the current becomes I (1−m) in period T1 and I (1+m) in period T2. When the output voltage V of the solar cell is larger than the optimal voltage Vs, the current becomes I (1−mb) in period T1 and I (1+mb) in period T2.

Here, ma, m and mb are determined by the slope of the output current-output voltage characteristic line of the solar cell, and since the power-voltage characteristic is bow-shaped, ma<m<mb (see FIG. 3).

Therefore, the current value Iin of the solar cell detected by the current detection circuit 7B becomes $Iin_0(1-ma)$ in period T1 and $Iin_0(1+ma)$ in period T2 when the output voltage V of the solar cell is lower than the optimal voltage Vs, where $Iin_0$ is the average value of Iin. When the output voltage V of the solar cell is the optimal voltage Vs, the current value Iin becomes $Iin_0(1-m)$ in period T1 and $Iin_0(1+m)$ in period T2. When the output voltage V of the solar cell is higher than the optimal voltage Vs, the current value Iin becomes $Iin_0(1-mb)$ in period T1 and $Iin_0(1+mb)$ in period T2.

The amplification factor A of the current detection circuit 7B becomes $A_0(1+m)$ in period T1 and $A_0(1-m)$ in period T2, where $A_0$ is the average value of A.

The output value Va of the current detection circuit 7B is given by Iin×A, and therefore when the output voltage V of the solar cell is smaller than the optimal voltage Vs, then Va=$Iin_0A_0(1-mb)$ (1+m)≈$Iin_0A_0(1+(m-mb))$ in period T1 and Va=$Iin_0A_0(1+mb)$ (1−m)≈$Iin_0A_0(1+(mb-m))$ in period T2.

When the output voltage V of the solar cell is the optimal voltage Vs, then

Va=$Iin_0A_0(1-m)$ (1+m)≈$Iin_0A_0$ in period T1, and

Va=$Iin_0A_0(1+m)$ (1−m)≈$Iin_0A_0$ in period T2.

When the output voltage V of the solar cell is larger than the optimal voltage Vs, then Va=$Iin_0A_0(1-mb)$ (1 +m)≈$Iin_0A_0(1+(m-mb))$ in period T1 and Va=$Iin_0A_0(1+mb)$ (1−m)≈$Iin_0A_0(1+(mb-m))$ in period T2.

$\Delta$Va is the difference between the output value Va of the current detection circuit 7B in period T2 and the output value Va in period T1, then $\Delta$Va=$2Iin_0A_0(ma-m)$ when the output voltage V of the solar cell is smaller than the optimal voltage Vs, $\Delta$Va=0 when the output voltage V of the solar cell is the optimal voltage Vs, and $\Delta$Va=$2Iin_0A_0(mb-m)$ when the output voltage V of the solar cell is larger than the optimal voltage Vs.

Because of the relationship ma<m<mb, the output Va of the current detection circuit 7B is smaller in period T2 than in period T1 when the output voltage V of the solar cell is smaller than the optimal voltage Vs, Va in period T1 and Va in period T2 are equal when the output voltage V of the solar cell is the optimal voltage Vs, and Va in period T1 is larger than Va in period T2 when the output voltage V of the solar cell is larger than the optimal voltage Vs.

In the discriminator circuit 8, the voltage of capacitor 81 is reset in period T1, and the output of the discriminator is input to the integrating circuit 9 through the capacitor 81 in period T2. The integrating circuit comprises an operational amplifier, and because it reverses polarity between the input and output, the output voltage value of the integrating circuit 9 increases when the output voltage V of the solar cell is lower than the optimal voltage Vs, remains fixed when the output voltage V of the solar cell is equal to the optimal voltage Vs, and decreases when the output voltage V of the solar cell is higher than the optimal voltage Vs.

Table 1 below shows the relationships between the detection input voltage, detection input current and modulation operation. The reference voltage E of the switching converter increases when -the output voltage V of the solar cell is lower than the optimal voltage Vs, remains fixed when the output voltage V of the solar cell is equal to the optimal voltage Vs, and decreases when the output voltage V of the solar cell is higher than the optimal voltage Vs.

TABLE 1

| Power point of solar cell | V < Vs | | V = Vs | | V > Vs | |
|---|---|---|---|---|---|---|
| Timing | Period T1 | Period T2 | Period T1 | Period T2 | Period T1 | Period T2 |
| Solar cell voltage V | $V(1+m)$ | $V(1-m)$ | $V(1+m)$ | $V(1-m)$ | $V(1+m)$ | $V(1-m)$ |
| Solar cell current I | $I(1-ma)$ | $I(1+ma)$ | $I(1-m)$ | $I(1+m)$ | $I(1-mb)$ | $I(1+mb)$ |
| Slope of I-V characteristic curve | $-(<I/V)$ | | $-I/V$ | | $-(>I/V)$ | |
| Detection voltage Vin | $Vin_0(1+ma)$ | $Vin_0(1-m)$ | $Vin_0(1+ma)$ | $Vin_0(1-m)$ | $Vin_0(1+ma)$ | $Vin_0(1-m)$ |
| Detection current Iin | $Iin_0(1-ma)$ | $Iin_0(1+ma)$ | $Iin_0(1-m)$ | $Iin_0(1+m)$ | $Iin_0(1-mb)$ | $Iin_0(1+mb)$ |
| Amplification factor A | $A_0(1+m)$ | $A_0(1-m)$ | $A_0(1+m)$ | $A_0(1-m)$ | $A_0(1+m)$ | $A_0(1-m)$ |
| Output voltage Va of current detection circuit 7B | $Iin_0A_0 \times (1+(m-ma))$ | $Iin_0A_0 \times (1+(ma-m))$ | $Iin_0A_0$ | $Iin_0A_0$ | $Iin_0A_0 \times (1+(m-mb))$ | $Iin_0A_0 \times (1+(mb-m))$ |
| Difference ΔVa of Va | $2Iin_0A_0(ma-m)$ | | 0 | | $2Iin_0A_0(mb-m)$ | |
| Polarity of ΔVa | Negative | | 0 | | Positive | |
| Output Vb of integrating circuit | Increase | | Constant | | Decrease | |
| Reference voltage E | Increase | | Constant | | Decrease | |

In this way, the simple circuit described above accurately controls the power point so that the power generated by the solar cell is maximized, and can also faithfully track the latest optimal power point based on the above operating principle even if the optimal power point should change due to various changes in the state of the solar cell such as changes in sunlight intensity.

Any one of an analog switching circuit fabricated in a semiconductor integrated circuit, a field-effect transistor, a junction transistor, and a diode-bridge circuit can be used as the semiconductor switching element. The operational amplifier uses only the reversed input, and therefore it can be replaced with a regular linear amplifier.

If the value of the alternation ratio 2 m is too small, it is easily affected by noise, and if it is too large, the range of the power point centered on the optimal power point is too wide, and the accuracy of controlling the maximum power point decreases. If the frequency of the pulse output from the pulse generator 10 is too high, it is affected by the stored charge of the solar cell and the input capacitance of the switching converter, thus resulting in errors in the tracking of the optimal power point. Further, if it is too low, the response of the tracking of the optimal power point is diminished.

The most effective value of the percent modulation m in this embodiment is between 0.001 and 0.02, and the most effective frequency of the pulse from the pulse generator 10 is between 30 Hz and 1 kHz. The output waveform from the sawtooth wave generator is particularly effective when its frequency is between 10 kHz and 500 kHz.

In the circuit configuration shown in FIG. 1, the output current I is detected in the detection current input circuit 7A based on the voltage drop across the resistor 71, but instead of detecting the voltage drop across the resistor 71, a circuit employing a Hall element or an element demonstrating a Faraday effect can also be used. The operation is the same as in the first embodiment, and it has the advantage of low energy loss in current detection.

Also in the circuit configuration in FIG. 1, an example of a booster, non-isolated type switching converter was described, but a step-down switching converter can also be used as the switching converter 2. In this case, it is best if the frequency of the pulse from the pulse generator 10 is sufficiently lower than the output frequency of the sawtooth wave generator, and it is particularly effective if it is lower than one-hundredth the output frequency of the sawtooth wave generator. As a matter of course, the switching converter is not limited to a non-isolated type, and an isolated switching converter can be used.

Figure 10:
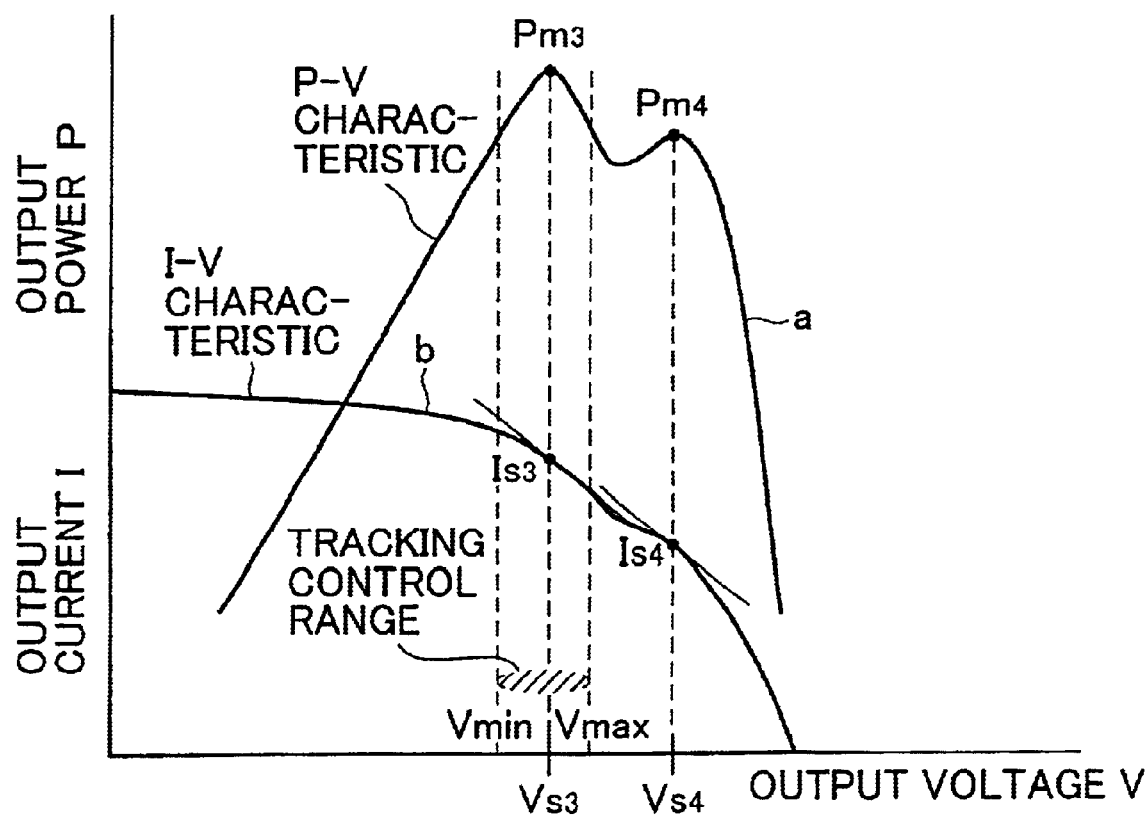
FIG. 10 is a graph showing the output power-voltage characteristic and output current-voltage characteristic of a solar cell when part of the solar cell is damaged.

FIG. 10 shows the output power vs. voltage characteristic (curve a) and output current vs. voltage characteristic (curve b) when the solar cell is partially damaged, where a maximal value $Pm_4$ exists besides the maximum value $Pm_3$ in the power-voltage characteristic. Even at the maximal output power, an operating voltage $Vs_4$ exists on the $-Is_4 Vs_4$ slope of the output current vs. output voltage characteristic. Therefore, by using a circuit for the switching pulse generator circuit 6 that eliminates this kind of operating voltage $VS_4$ and has an operating range only in the vicinity of the operating voltage $Vs_a$ corresponding to the maximum output power $Pm_3$, tracking of the true optimal power point can be achieved.

Since the output voltage of the solar cell is controlled by the reference voltage E of the switching converter, tracking of the true optimal power point is made possible even when a maximal value exists in addition to the maximum value by limiting the predetermined range of the reference voltage E of the switching converter.

In the circuits in FIG. 5 and FIG. 6, the voltage Vin of the input terminal 61 is a voltage obtained by multiplying the voltage of the solar cell by the division ratio of the resistor 51 and resistor 52. The reference voltage, on the other hand, is obtained by combining the standard voltage Vs' and the output voltage Vb (voltage of input terminal 71) from the integrating circuit 9 via resistor 67, resistor 70, and resistor 72.

The range of the output voltage Vb from the integrating circuit 9 is limited to the range of the output voltage of the operational amplifier 91. Also, a voltage regulator is normally used as the power source for the operational amplifier. For that reason, a constant minimum voltage (Vbmin) and maximum voltage (Vbmax) are present in the output voltage Vb.

Where the division ratio of the resistor 51 and resistor 52 is r5, the resistance value of the resistor 67 is R6, and the resistance value of the resistor 72 is R7, the minimum input voltage Vmin and maximum input voltage Vmax of the switching converter have the following relationship.

$$V\text{min}/r5 \approx (V b\text{min} \times R6 + V s'R7)(R6+R7)$$

$$V\text{max}/r5 \approx (V b\text{max} \times R6 + V s'R7)(R6+R7)$$

The range of the optimal voltage value Vs that can be expected based on temperature changes, sunlight intensity changes, etc., affecting the solar cell is determined by the minimum input voltage Vmin and maximum input voltage Vmax of the switching converter necessary to track the true optimal power point of the voltage V4, which is the maximum power value but not an extreme value. By selecting a suitable division ratio r5, resistance value R6, resistance value R7 and standard voltage value Vs', the input voltage range of the switching converter can be selected, thus making it possible to track the true optimal power point when maximal values (local maxima) exist in addition to the maximum value.

A diode clip method that performs voltage limiting of a fixed voltage through a diode, or connecting two diode voltage regulators connected in series with polarities reversed in parallel with the capacitor 92 can be used as the method for limiting the output voltage of the operational amplifier. This method has the advantage of being able to more accurately set the range that limits the voltage.

Figure 11A:
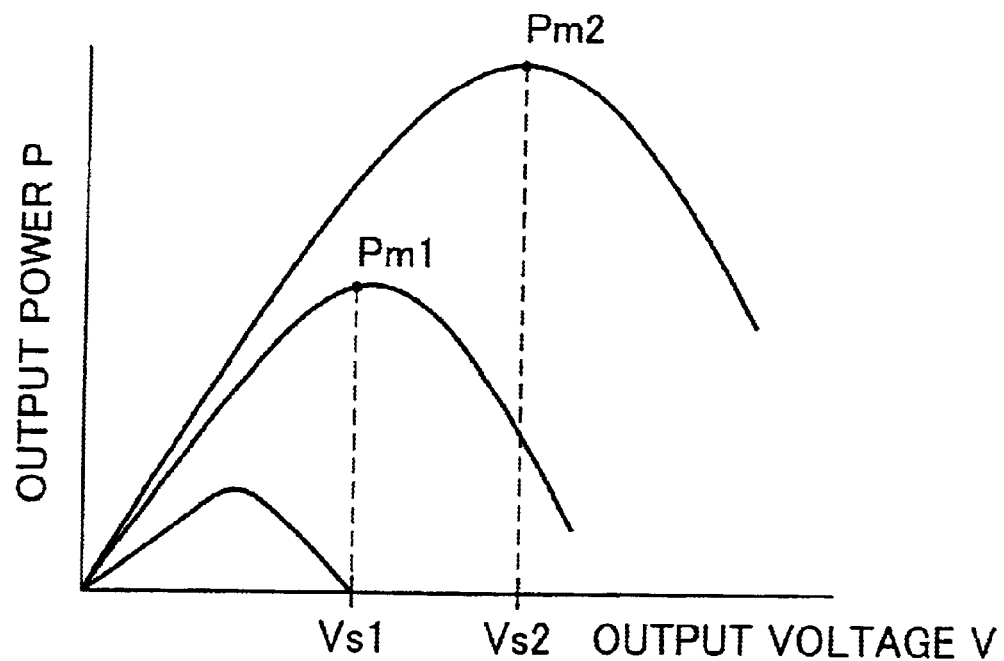
FIG. 11(a) is a graph showing the output power-voltage characteristic when the power source is a wind generator.
Figure 11B:
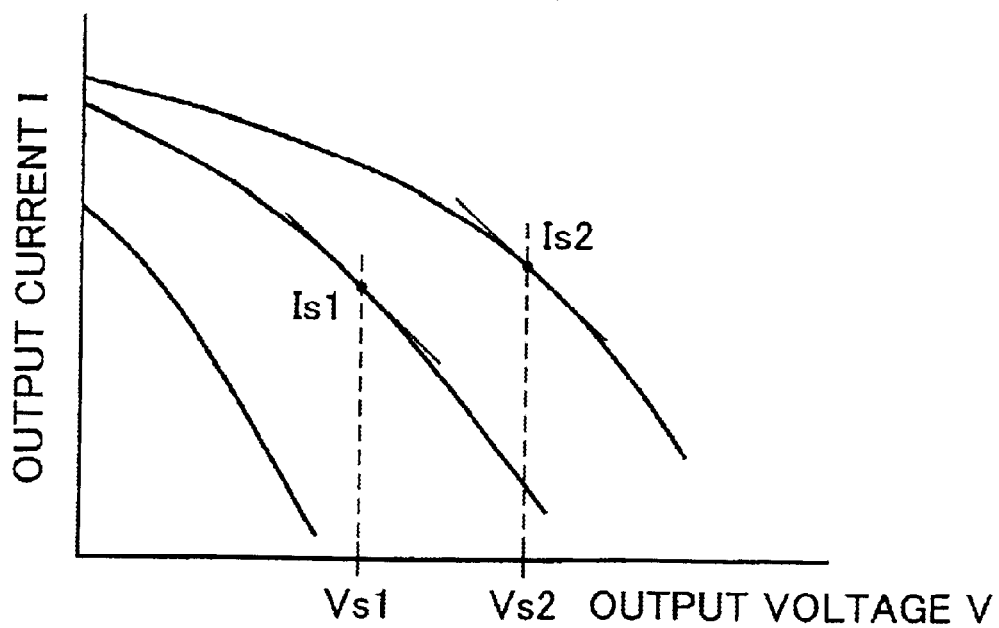
FIG. 11(b) is a graph showing the output current-voltage characteristic when the power source is the wind generator.

FIGS. 11(a) and 11(b) are graphs showing the output characteristics of power sources that output a direct-current power by means of rotation of a generator by wind power. It is clear that a power source whose output current vs. output voltage has a bow-shaped characteristic like this demonstrates a maximum output power at the point of inflection of the characteristic curve. By means of the same operation as in the case of the first embodiment in FIG. 1, the power point at the maximum power can be tracked automatically. Even in a power source that supplies direct-current power by means of rotation of a generator by wave power, the power point at the maximum power can be tracked automatically by means of the same operation as in the case of the first embodiment in FIG. 1.

In a case in which power sources with different types of bow-shaped curves are used such as when solar cells and wind generators are used together, the output characteristic will vary depending on the ambient conditions. Here, the output characteristics of the combined power sources may take the form of the output current-output voltage characteristic shown in FIG. 10, and therefore by limiting the input voltage range of the switching converter to a predetermined range in the same way as with multiple solar cells, the true optimal power point can be tracked even when extreme values exist in addition to the maximum value.

In this way, this invention uses a simple circuit as that described above to accurately control the power point so that the power generated by the solar cell, etc., is maximized and to track fluctuations in the optimal power point. The circuit that tracks the power point in the optimal power point tracking method described above uses as its main components a simple pulse generator circuit and amplifier together with a semiconductor switch, and since the circuit can be realized using a small number of general-use components, it is economical.

Further, by using the method of this invention, it is possible to obtain the maximum generated power from solar cells, etc., at low cost and energy utilization efficiency can be improved, thus shortening the time required to recover equipment investment costs.

What is claimed is:

1. A maximum power point tracking method for use in a system in which power from a direct-current power source, which has a bow-shaped current-voltage characteristic, is supplied to a load via a switching converter, the method comprising:

performing low frequency, minute modulation of an output voltage of the direct-current power source;

detecting an output current value of the direct-current power source in a current detection circuit after performing the modulation, the current detection circuit being configured to perform an amplification factor switching function that switches an amplification factor of the current detection circuit between definite magnitudes in synchronization with the performed modulation to produce an output; and controlling said switching converter using a signal obtained in a discriminator circuit by demodulating the output of the current detection circuit in synchronization with the performed modulation.

2. The maximum power point tracking method of claim 1, further comprising:

limiting the input voltage of the switching converter to a predetermined range.

3. The maximum power point tracking method of claim 2, wherein said direct-current power source includes at least one of a solar cell, a direct-current power source that generates power using wind power, and a direct-current power source that generates power using wave power.

4. The maximum power point tracking method of claim 1, wherein said direct current power source includes at least one of a solar cell, a direct-current power source that generates power using wind power, and a direct-current power source that generates power using wave power.

5. A maximum power point tracking device that supplies power of a direct-current power source, which has a bow-shaped current-voltage characteristic, to a load, said maximum power point tracking device comprising:

a first circuit configured to perform low-frequency, minute modulation by alternately switching an output voltage of the direct-current power between two voltage values;

a second circuit configured to detect an output current value of the direct-current power source and to perform an amplification factor switching function that switches an amplification factor of the second circuit between definite magnitudes in synchronization with the modulation performed by the first circuit;

a third circuit configured to obtain a component of an output of the second circuit in synchronization with the modulation performed by the first circuit; and a fourth circuit configured to use an output of the third circuit to generate a signal that is transmitted to a switching converter control circuit.

6. The maximum power point tracking device of claim 5, further comprising the switching converter control circuit, which is configured to limit the input voltage of the switching converter to a predetermined range.

7. The maximum power point tracking device of claim 6, wherein the direct current power source is at least one of a solar cell, a direct-current power source that generates power using wind power, and a direct-current power source that generates power using wave power.

8. The maximum power point tracking device of claim 5, wherein the direct current power source is at least one of a solar cell, a direct-current power source that generates power using wind power, and a direct-current power source that generates power using wave power.

* * * * *